(12) United States Patent
Homuth et al.

(10) Patent No.: US 8,055,580 B1
(45) Date of Patent: *Nov. 8, 2011

(54) PROVIDING A CUSTOMER ONE OR MORE OPTIONS FOR INCREASING A LINE OF CREDIT

(75) Inventors: Brandon G. Homuth, Richmond, VA (US); Christopher M. Luo, Somerville, MA (US); Amy E. Mays, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,246

(22) Filed: Mar. 15, 2010

Related U.S. Application Data

(63) Continuation of application No. 12/147,174, filed on Jun. 26, 2008, now Pat. No. 7,685,066, which is a continuation of application No. 10/235,274, filed on Sep. 5, 2002, now Pat. No. 7,409,369.

(51) Int. Cl.
*G06Q 40/00* (2006.01)
(52) U.S. Cl. ........................................................ 705/38
(58) Field of Classification Search ..................... 705/38
See application file for complete search history.

(56) References Cited

U.S. PATENT DOCUMENTS

| | | | | |
|---|---|---|---|---|
| 5,025,138 A | * | 6/1991 | Cuervo | 705/38 |
| 5,239,462 A | * | 8/1993 | Jones et al. | 705/38 |
| 5,602,529 A | * | 2/1997 | Wegmann et al. | 340/566 |
| 5,774,882 A | * | 6/1998 | Keen et al. | 705/38 |
| 5,866,889 A | * | 2/1999 | Weiss et al. | 235/379 |
| 6,121,565 A | * | 9/2000 | Allott, III | 209/584 |
| 6,209,149 B1 | * | 4/2001 | Song et al. | 4/498 |
| 2002/0046065 A1 | * | 4/2002 | Nighan | 705/4 |
| 2002/0156723 A1 | * | 10/2002 | Lilly et al. | 705/38 |
| 2002/0188533 A1 | * | 12/2002 | Sanchez et al. | 705/30 |
| 2003/0046222 A1 | * | 3/2003 | Bard et al. | 705/38 |
| 2007/0078759 A1 | * | 4/2007 | Lilly et al. | 705/38 |

* cited by examiner

*Primary Examiner* — Lindsay M. Maguire
(74) *Attorney, Agent, or Firm* — Hunton & Williams LLP

(57) ABSTRACT

A method for providing a customer one or more options for increasing a line of credit includes communicating to a customer one or more solicitations offering the customer a credit account and providing the customer one or more options for increasing a line of credit associated with the credit account. The method also includes receiving a response to the one or more solicitations from the customer requesting the credit account and selecting at least one of the one or more options. The method also includes storing data associated with the credit account to book the credit account according to the response from the customer. At least some of the data reflects the one or more options selected by the customer and an increase of the line of credit provided as a result of the selection of the at least one option by the customer.

20 Claims, 2 Drawing Sheets

PROVIDING A CUSTOMER ONE OR MORE OPTIONS FOR INCREASING A LINE OF CREDIT

CROSS REFERENCE

This application is a continuation of application Ser. No. 12/147,174, filed Jun. 26, 2008 and issued Mar. 23, 2010 as U.S. Pat. No. 7,685,066, which is a continuation of application Ser. No. 10/235,274, filed Sep. 5, 2002 and issued Aug. 5, 2008 as U.S. Pat. No. 7,409,369.

TECHNICAL FIELD OF THE INVENTION

This invention relates generally to credit cards and, more particularly, to providing a customer one or more options for increasing a line of credit.

BACKGROUND OF THE INVENTION

A credit card issuer, such as a bank or other financial institution, generally provides credit accounts to customers, or cardholders, allowing the customers to make purchases on credit rather than using cash. A customer incurs debt with each credit card purchase which may be repaid over time according to the terms and conditions of the particular customer's credit account. Credit card accounts provide a customer one or more lines of credit, typically including at least one revolving credit line in which the customer may choose to pay the full amount of debt owed on an account by a specified date or alternatively defer payment of all or a portion of the debt to a later date. The credit card issuer typically charges the customer interest or finance charges for such deferred payments during the period of deferral. The credit card issuer typically establishes a credit limit for each credit account defining the maximum amount of credit available to the customer for making purchases at any given time. When a customer makes a credit card purchase, the amount of credit available to the customer, often called the available balance, is reduced by the amount of the purchase, and the amount of debt currently owed by the customer, often called the outstanding balance, is increased by the amount of the purchase.

Providing relatively low lines of credit to customers may be disadvantageous to a credit card issuer. Customers tend to dislike low lines of credit, and attrition among customers with low credit lines tends to be relatively high. Customers with low lines of credit may also give the credit card issuer bad word-of-mouth publicity, hurting the ability of the credit card issuer to acquire new customers. In addition, customers with lower lines of credit may tend to use their credit cards less often than customers with higher lines of credit. Moreover, providing low lines of credit to customers may cause low morale among employees of the credit card issuer, who may feel as though they are working as "loan sharks" or in some other disreputable capacity. However, considerable risk to the credit card issuer is often associated with certain customers, and providing higher lines of credit to those customers may increase losses incurred by the credit card issuer.

SUMMARY OF THE INVENTION

In accordance with the present invention, a system and method is provided that substantially eliminates or reduces the disadvantages and problems associated with extending low lines of credit to customers.

According to one embodiment, a method for providing a customer one or more options for increasing a line of credit includes communicating to a customer one or more solicitations offering the customer a credit account and providing the customer one or more options for increasing a line of credit associated with the credit account. The method also includes receiving a response to the one or more solicitations from the customer requesting the credit account and selecting at least one of the one or more options. The method also includes storing data associated with the credit account to book the credit account according to the response from the customer. At least some of the data reflects the one or more options selected by the customer and an increase of the line of credit provided as a result of the selection of the at least one option by the customer.

According to another embodiment, a method for providing a customer one or more options for increasing a line of credit includes communicating to a customer one or more solicitations offering the customer a credit account, receiving a response to the one or more solicitations from the customer requesting the credit account, and storing data associated with the credit account to book the credit account according to the response from the customer. The method also includes providing the customer one or more options for increasing a line of credit associated with the booked credit account, receiving a selection of at least one of the one or more options from the customer, and, in response to receiving the selection from the customer, updating the stored data associated with the booked credit account to reflect the one or more options selected by the customer and an increase of the line of credit provided as a result of the selection of the at least one option by the customer.

Various embodiments of the present invention may provide one or more advantages. It should be noted that certain embodiments may benefit from some, none, or all of these advantages.

Particular embodiments may allow a credit card issuer to provide increased lines of credit to certain customers without incurring substantially increased losses. Particular embodiments may reduce attrition among certain customers. Particular embodiments may increase credit card usage by certain customers. Particular embodiments may facilitate goodwill between a credit card issuer and its customers, which may, in turn, facilitate efforts by the credit card issuer to acquire new customers. Other advantages may be readily apparent to one having ordinary skill in the art from the figures, descriptions, and claims included herein.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and associated advantages may be understood by referring now to FIGS. 1 through 4 of the drawings, in which like numerals refer to like parts.

Figure 1:
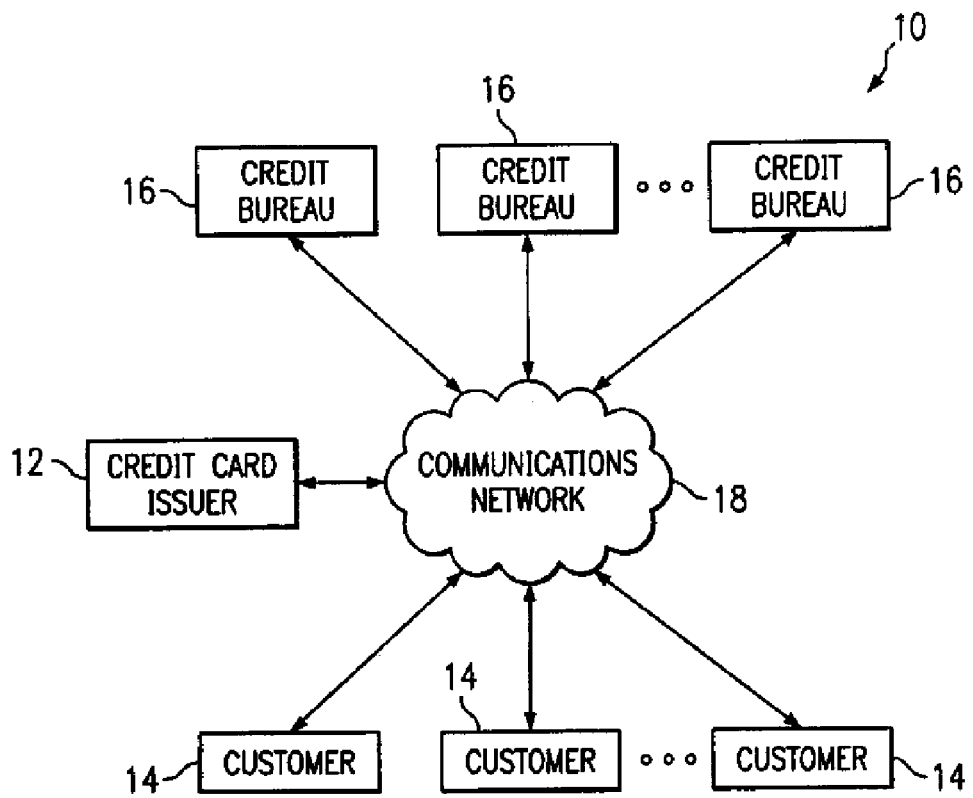
FIG. 1 illustrates an example system for handling credit card accounts.

FIG. 1 illustrates an example system 10 for handling credit card accounts. System 10 may include a credit card issuer 12, one or more customers 14, and one or more credit bureaus 16, which may be coupled to each other by a communications network 18. Credit card issuer 12 and customers 14 may communicate with each other regarding credit card accounts using communications network 18. For example, a customer 14 may contact credit card issuer 12 using communications network 18 to open a credit card account, make inquiries or requests regarding a credit card account, make payments to credit card issuer 12, or close a credit card account. Credit card issuer 12 may similarly contact customer 14 to offer a credit card to customer 14, make inquiries regarding recent charges posted to a credit card account, or remind customer 14 of payments due. Although credit card issuer 12 and customers 14 are described as communicating with each other using communications network 18, the present invention contemplates any suitable form of communication between credit card issuer 12 and customers 14. For example, a customer 14 may contact credit card issuer 12 by telephone to make inquiries or requests regarding a credit card account or by mail to make a payment to credit card issuer 12. Similarly, credit card issuer 12 may contact a customer 14 by mail to offer a credit card to customer 14. Credit card issuer 12 may communicate with credit bureau 16 using communications network 18 to obtain credit information regarding customers 14, as described more fully below.

A customer 14 (which may also be referred to as a cardholder 14) may include an individual, a group of individuals, a business organization, or any other suitable entity to which credit card issuer 12 may issue one or more credit cards and provide one or more lines of credit. A credit bureau 16 may provide credit information to credit card issuer 12 regarding customers 14. Credit information may include credit history information, payment information, personal information regarding occupation, income, home ownership, etc., and any other suitable information. As an example only an not by way of limitation, a credit bureau 16 may include TRANS UNION, EQUIFAX, EXPERIAN, or any otter suitable credit bureau. Communications network 18 may, in particular embodiments, include one or more local area networks (LANs), metropolitan area networks (MANS), wide area networks (WANs), portions of the Internet, or any other appropriate wireline, optical, wireless, or other links.

Credit card issuer 12 may include any suitable entity that issues credit cards to customers 14 and provides lines of credit (which may include revolving lines of credit) for purchases by customers 14. As an example only and not by way of limitation, credit card issuer 12 may in particular embodiments include a merchant or other bank or a credit union. Although purchases are described, the present invention contemplates any suitable transactions in which payments may be made using credit cards. For example, a customer 14 may use a credit card to rent one or more items. Credit card issuer 12 may issue any suitable credit cards. As an example and not by way of limitation, credit card issuer 12 may issue one or more MASTERCARD, VISA, DISCOVER, DINERS CLUB, JCB or other suitable credit cards. Credit cards issued by credit card issuer 12 may include general purpose credit cards (which may be used to purchase a number of different items associated with a number of different industries from a number of different merchants), private label cards (which may be used to purchase only items associated with a particular industry or items from only one or more particular merchants), or both. Although cards are particularly described, the present invention contemplates, in addition to credit card accounts having associated cards issued to customers 14, credit accounts that do not have associated cards. For example, credit card issuer 12 may open a credit account for a customer 14 having an associated credit account number but no associated card. Customer 14 may then purchase items on credit using the associated credit account number. Reference to "credit cards" or "credit card accounts" may, where appropriate, encompass such credit accounts.

Credit card issuer 12 may handle credit card accounts, which may include opening credit card accounts for customers 14, monitoring credit card accounts, billing customers 14, receiving and handling inquiries and requests from customers 14 regarding credit card accounts, and closing credit card accounts. In particular embodiments, as described more fully below, opening a credit card account for a customer 14 may include establishing a line of credit according to credit information from credit bureau 16 regarding customer 14, information obtained from customer 14 directly, one or more evaluations of payments received from customer 14, or other suitable information, establishing one or more terms of a credit card account agreement between credit card issuer 12 and customer 14, and activating one or more services which credit card issuer 12 may provide to customer 14 in connection with the credit card account.

Figure 2:
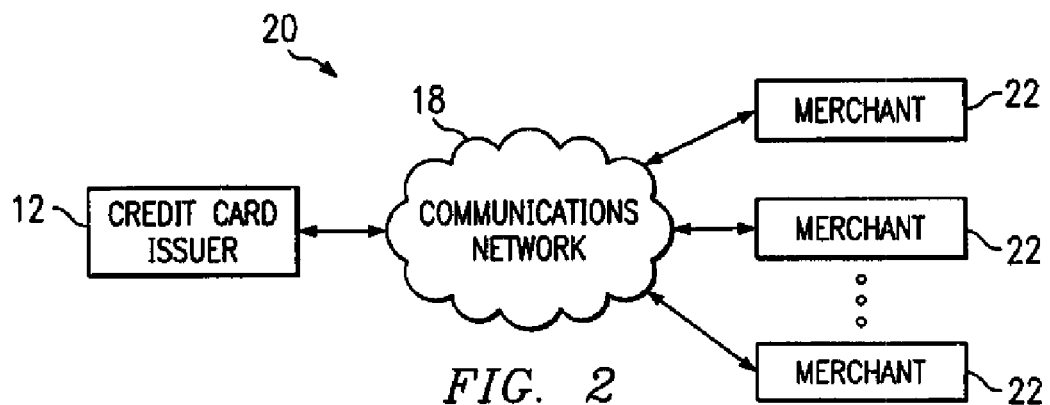
FIG. 2 illustrates an example system for handling transactions in which payments are made using credit cards.

FIG. 2 illustrates an example system 20 for handling transactions in which payments are made using credit cards. System 20 may include credit card issuer 12 and one or more merchants 22, which may be coupled to each other by communications network 18. A merchant 22 may include any suitable entity that sells items to cardholders and may include a single entity (such as, for example, an individual store) or a number of entities (such as, for example, a chain of stores). A merchant 22 may include a seller or distributor that sells items produced by one or more otherwise unaffiliated producers. In addition or as an alternative, merchant 22 may include a producer that sells one or more items it produces directly to cardholders, bypassing distributors. Merchant 22 may include one or more outlets at one or more physical locations and may, in addition or as an alternative, include one or more call centers where phone orders are received from cardholders, one or more websites or other virtual locations where electronic orders are received from cardholders, and one or more warehouses (which may be owned by merchant 22 or owned by one or more entities separate from merchant 22 for which merchant 22 sells items to cardholders) where orders received from cardholders are filled. Payment may be made for items provided by merchant 22 using a general purpose card, private label card, or any other suitable credit card. Although merchants 22 are described as selling items to customers 14, the present invention, as described above, contemplates any suitable transactions between merchants 22 and customers 14. As an example, a merchant 22 may rent one or more items to a customer 14. As another example, a merchant 22 may provide one or more services to a customer 14.

Communications network 18 supporting communication between credit card issuer 12 and merchant 22 may include, as described above, one or more local area networks (LANs), metropolitan area networks (MANs), wide area networks (WANs), portions of the Internet, or any other appropriate wireline, optical, wireless, or other links. Communications network 18 may, where appropriate, include one or more private networks used exclusively for communication between credit card issuer 12 and one or more particular merchants 22. This may be the case where, for example, credit card issuer 12 provides lines of credit to customers 14 to purchase items only at one or more particular merchants 22. Although credit card issuer 12 and merchants 22 are described as separate entities, in particular embodiments, credit card issuer 12 and one or more merchants 22 may be part of a single, larger organization. In particular embodiments, credit card issuer 12 may include one or more merchants 22. In particular embodiments one or more merchants 22 may include credit card issuer 12.

A customer 14 may purchase items from a merchant 22 in any suitable manner. As an example, customer 14 may purchase items from merchant 22 at a store or other physical location operated by merchant 22. As another example, customer 14 may purchase items from merchant 22 over the telephone, by mail, or using the Internet or other suitable communications network (which may be similar to communications network 18), and the purchased items may be subsequently shipped to customer 14. When a customer 14 purchases one or more items from a merchant 22, merchant 22 may generate an electronic record of the transaction and communicate the generated record to credit card issuer 12. A transaction record may be generated in any suitable manner, such as at a point-of-sale terminal or other device, and may include any suitable transaction data. For example, a transaction record may include data reflecting a credit card number (or, as described above, a credit account number), data reflecting a transaction price, data identifying merchant 22, and data reflecting a transaction date. Credit card issuer 12 may use the communicated transaction record to update the credit card account of customer 14 for billing and possibly other purposes.

Figure 3:
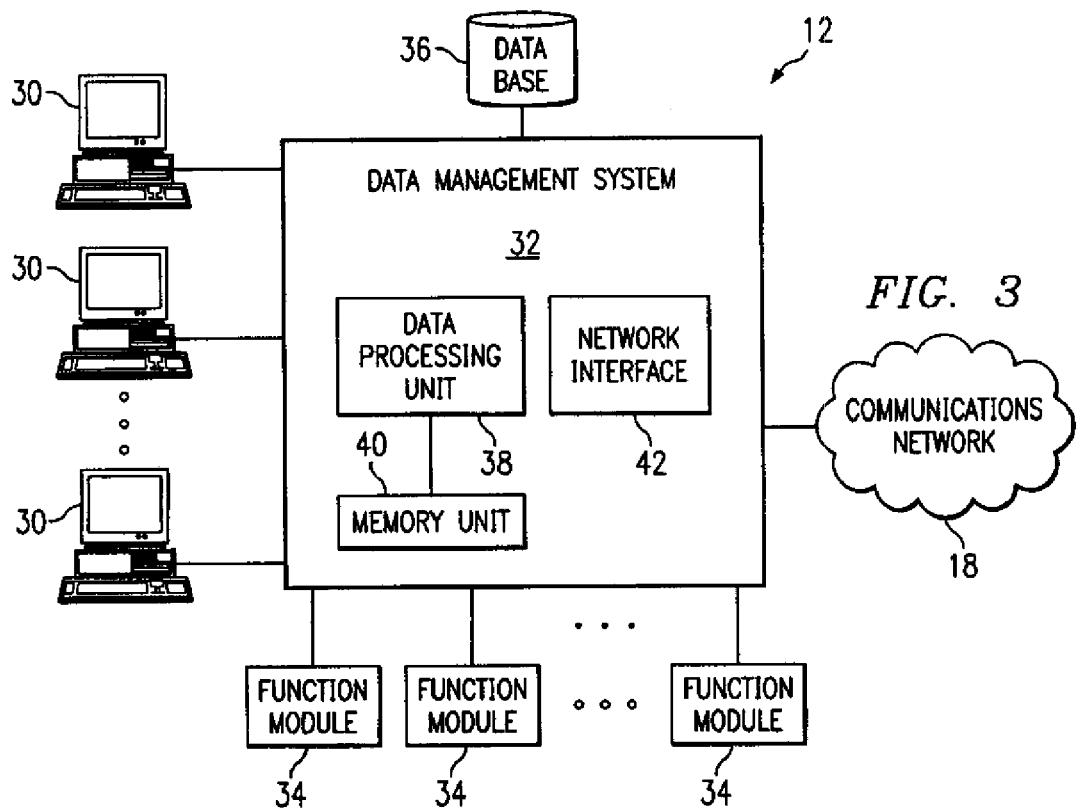
FIG. 3 illustrates various details and functions of a credit card issuer in the credit card account system of FIG. 1.

FIG. 3 illustrates an example credit card issuer 12. Credit card issuer 12 may include one or more operator terminals 30, a data management system 32, one or more function modules 34, and a database 36. The components of credit card issuer 12 may be located at a single site or, alternatively, at a number of different sites. The components of credit card issuer 12 may be coupled to each other using one or more links, each of which may include one or more computer buses, local area networks (LANs), metropolitan area networks (MANs), wide area networks (WANs), portions of the Internet, or any other appropriate wireline, optical, wireless, or other links. An operator terminal 30 may provide an operator access to data management system 32 to configure, manage, or otherwise interact with data management system 32. An operator terminal 30 may include a computer system (which may include one or more suitable input devices, output devices, processors and associated memory, mass storage media, communication interfaces, and other suitable components) or other suitable device.

Data management system 32 may manage data associated with credit card accounts, which may in particular embodiments include creating, modifying, and deleting data files associated with credit card accounts automatically or in response to data received from one or more operator terminals 30, function modules 34, or customers 14. Additionally, data management system 32 may call one or more function modules 34 to provide particular functionality according to particular needs, as described more fully below. Data management system 32 may include a data processing unit 38, a memory unit 40, a network interface 42, and any other suitable components for managing data associated with credit card accounts. The components of data management system 32 may be supported by one or more computer systems at one or more sites. One or more components of data management system 32 may be separate from other components of data management system 32, and one or more suitable components of data management system 32 may, where appropriate, be incorporated into one or more other suitable components of data management system 32.

Data processing unit 38 may process data associated with credit card accounts, which may include executing coded instructions (which may in particular embodiments be associated with one or more function modules 34). Memory unit 40 may be coupled to data processing unit 38 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Network interface 40 may provide an interface between data management system 32 and communications network 18 such that data management system 32 may communicate with customers 14, credit bureaus 16, and merchants 22.

A function module 34 may provide particular functionality associated with handling credit card accounts or handling transactions in which payments are made using credit cards. As an example only and not by way of limitation, a function module 34 may provide functionality associated with risk profiling, service interest, service enrollment, credit card account management, or billing. A function module 34 may be called by data management system 32 (possibly as a result of data received from an operator terminal 30 or a customer 14 via communications network 18) and, in response, provide the particular functionality associated with function module 34 and communicate one or more results to data processing unit 38 or one or more other suitable components of data management system 32, which may use the communicated results to create, modify, or delete one or more data files associated with one or more credit card accounts, provide data to an operator at operator terminal 30 or customer 14, or perform any other suitable task. Function modules 34 may be physically distributed such that each function module 34, or multiple instances of each function module 34, may be located at different sites remote from each other and possibly from data management system 32.

There may be advantages associated with providing increased lines of credit to certain customers 14 of credit card issuer 12. Increasing the lines of credit available to certain customers 14 may reduce attrition among those customers 14 and increase credit card usage by those customers 14. In addition, increasing the lines of credit available to certain customers 14 may facilitate goodwill between credit card issuer 12 and those customers 14, which may, in turn, facilitate efforts by credit card issuer 12 to acquire new customers 14. However, considerable risk to the credit card issuer may be associated with certain customers 14, and increasing lines of credit available to those customers 14 may increase losses incurred by credit card issuer 12.

To provide increased lines of credit to certain customers without incurring substantially increased losses, credit card issuer 12 may provide customers 14 one or more options for increasing lines of credit. As an example only and not by way of limitation, credit card issuer 12 may provide an increased line of credit to a customer 14 if customer 14 enrolls in one or more particular services offered by credit card issuer 12. Credit card issuer 12 may, in particular embodiments, charge customer 14 one or more fees for providing these services. One or more of these service may provide customer 14 on-line access to a credit account. One of more of these services may automatically withdraw from a checking account of customer 14 amounts owed by customer 14 to credit card issuer 12. Although particular services are described, the present invention contemplates any suitable services. Reference to an "increased" line of credit may include a line of credit that is greater than a line of credit that credit card issuer 12 would otherwise provide to customer 14.

Credit card issuer 12 may provide customer 14 any suitable option for increasing a line of credit. As described above, credit card issuer 12 may provide an increased line of credit to customer 14 if customer 14 enrolls in one or more particular services. As another example, credit card issuer 12 may provide an increased line of credit to customer 14 if customer 14 provides suitable verification of a bank account, a phone bill, a utility bill, or something similar. As another example, credit card issuer 12 may provide an increased line of credit to customer 14 if customer 14 adds a guarantor to the credit account. As another example, credit card issuer 12 may provide an increased line of credit to customer 14 if customer 14 adds an authorized user to the credit account. As another example, credit card issuer 12 may provide an increased line of credit to customer 14 if customer 14 pays one or more fees for the increased line of credit. As another example, credit card issuer 12 may provide an increased line of credit to customer 14 if customer 14 secures the credit account. In particular embodiments, customer 14 may secure the credit account by providing a lien against property owned by customer 14. In particular embodiments, customer 14 may secure the credit account by making a refundable security deposit.

Credit card issuer 12 may provide any suitable number of options to customer 14 for increasing a line of credit and may allow customer 14 to select any suitable number of these options. As an example, credit card issuer 12 may provide customer 14 only one option for increasing a line of credit and decline to increase that line of credit if customer 14 does not select that one option. As another example, credit card issuer 12 may provide customer 14 three options for increasing a line of credit and increase that line of credit if customer 14 selects one of the three options. As yet another example, credit card issuer 12 may provide customer 14 five options for increasing a line of credit and increase that line of credit only if customer 14 selects two of the five options.

In particular embodiments, credit card issuer 12 may provide only certain customers 14 one or more options for increasing lines of credit. These customers 14 may meet or fail to meet certain criteria. As an example, credit card issuer 12 may provide one or more options for increasing lines of credit only to those customers 14 having certain credit histories. As another example, credit card issuer 12 may provide one or more options for increasing lines of credit only to those customers 14 associated with a certain amount of risk to credit card issuer 12. In particular embodiments, credit card issuer 12 may provide all customers 14 of credit card issuer 12 one or more options for increasing lines of credit.

Credit card issuer 12 may increase a line of credit any suitable amount. In particular embodiments, the amount of the increase may be independent of the one or more options selected by customer 14. As an example, credit card issuer 12 may provide customer 14 two options for increasing a line of credit. If customer 14 selects either of these two options, credit card issuer 12 may increase the line of credit by three hundred dollars. In particular embodiments, the amount of the increase may depend on the one or more options selected by customer 14. As an example, credit card issuer 12 may provide customer 14 three options for increasing a line of credit. If customer 14 selects the first of the three options, credit card issuer 12 may increase the line of credit by two hundred fifty dollars. If customer 14 selects the second of the three options, credit card issuer 12 may increase the line of credit by three hundred fifty dollars. If customer 14 selects the third of the three options, credit card issuer 12 may increase the line of credit by four hundred dollars.

In particular embodiments, where credit card issuer 12 provides customer 14 more than one option for increasing a line of credit and allows customer 14 to select more than one of these options, the amount of credit line increase may depend on the number of options selected by customer 14. As an example, credit card issuer 12 may provide customer 14 two options for increasing a line of credit. If customer 14 selects only the first of the two options or only the second of the two options, credit card issuer 12 may increase the line of credit by one hundred fifty dollars. If, on the hand, customer 14 selects both the first and the second options, credit card issuer 12 may increase the line of credit by two hundred twenty-five dollars. In particular embodiments, where credit card issuer 12 provides customer 14 more than one option for increasing a line of credit and allows customer 14 to select more than one of these options, the amount of credit line increase may depend on the particular combination of options selected by customer 14. As an example, credit card issuer 12 may provide customer 14 three options for increasing a line of credit. If customer 14 selects only the first of the three options, only the second of the two options, or only the third of the three options, credit card issuer 12 may increase the line of credit by one hundred fifty dollars. If customer 14 selects both the first and the second options, credit card issuer 12 may increase the line of credit by two hundred twenty-five dollars. If customer 14 selects both the first and the third options, credit card issuer 12 may increase the line of credit by two hundred seventy-five dollars. If customer 14 selects both the second and the third options, credit card issuer 12 may increase the line of credit by three hundred dollars. If customer 14 selects all three options, credit card issuer 12 may increase the line of credit by four hundred dollars.

Credit card issuer 12 may provide one or more options to customer 14 for increasing a line of credit at any suitable time and under suitable circumstances. As an example, credit card issuer 12 may mail or otherwise communicate one or more solicitations to potential customers 14 that inform those customers 14 of the options available from credit card issuer 12 for increasing a line of credit. These solicitations may include one or more application forms. A potential customer 14 may receive one of these solicitations; complete the included forms, indicating which (if any) of the options customer 14 selects; and mail the forms to credit card issuer 12. Credit card issuer 12 may receive the completed applications forms and book the new credit account with a credit line increase according to the one or more options selected by customer 14. To book the new credit account, one or more components of data management system 32 and possibly one or more function modules 34 may be used to store appropriate data associated with the new credit account in database 36. In particular embodiments, this data may be stored as a file indexed by the credit account number associated with the new credit account. The stored data may reflect the one or more options selected by customer 14 and the credit line increase. This data may be used to generate periodic account statements, to generate bills, and to accomplish other suitable tasks.

As another example, credit card issuer 12 may inform customer 14 of the options available from credit card issuer 12 for increasing the line of credit when customer 14 contacts credit card issuer 12 to activate the credit account. If customer 14 selects one or more of these options at that time, the stored data associated with the booked credit account may then be updated to reflect the one or more options selected by customer 14 and the credit line increase. As yet another example, credit card issuer 12 may inform customer 14 of the options available from credit card issuer 12 for increasing the line of credit when customer 14 contacts credit card issuer to request a credit line increase. If customer 14 selects one or more of these options at that time, the stored data associated with the booked credit account may then be updated to reflect the one or more options selected by customer 14 and the credit line increase, as described above.

Figure 4:
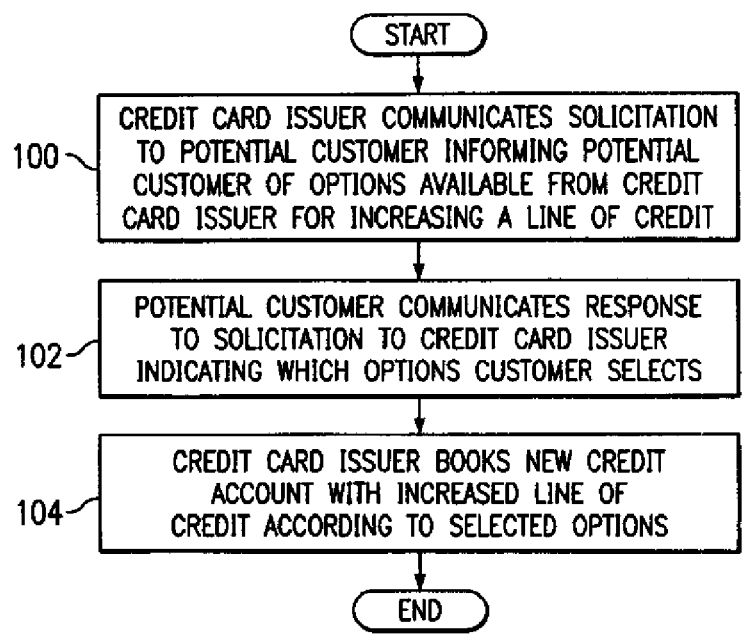
FIG. 4 illustrates an example method for providing a customer one or more options for increasing a line of credit.

FIG. 4 illustrates an example method for providing a customer 14 one or more options for increasing a line of credit. The method begins at step 100, where credit card issuer mails or otherwise communicates a solicitation to a potential customer 14 informing potential customer 14 of one or more options available from credit card issuer for increasing a line of credit. As described above, these solicitations may include one or more application forms. At step 102, potential customer 14 communicates a response to the solicitation to credit card issuer 12 indicating which (if any) of the available options customer 14 selects. As described above, this may include potential customer 14 receiving the solicitation; completing the included forms, indicating which (if any) of the options customer 14 selects; and mailing the forms to credit card issuer 12. At step 104, credit card issuer 12 receives the response of customer 14 and books the new credit account with the increased line of credit according to the options selected by customer 14, at which point the method ends. As described above, to book the new credit account, one or more components of data management system 32 and possibly one or more function modules 34 may be used to store appropriate data associated with the new credit account in database 36.

Although an embodiment of the invention and its advantages are described in detail, a person skilled in the art could make various alternations, additions, and omissions without departing from the spirit and scope of the present invention as defined by the appended claims.

What is claimed is:

1. A system for providing a customer a plurality of options for increasing a line of credit, the system comprising:
one or more computer processors collectively programmed to:
provide to a customer a plurality of options for increasing a line of credit associated with a credit account held by the customer, wherein the plurality of options each comprise an action to be taken by the customer other than acceptance of the credit account and payment activities associated with an outstanding balance of the credit account;
receive first data reflecting that the customer actively selected one or more options from among the plurality of options by performing the one or more actions that comprise the selected one or more options;
store the first data; and
store second data to reflect an increase of the line of credit provided as a result of the selection of the one or more options.

2. The system of claim 1, wherein the amount of the increase of the line of credit depends, at least in part, on the number of options selected by the customer.

3. The system of claim 1, wherein the amount of the increase of the line of credit depends, at least in part, on the one or more options selected by the customer.

4. The system of claim 1, wherein the plurality of options is provided only to certain customers.

5. The system of claim 4, wherein the certain customers have particular credit histories.

6. The system of claim 1, wherein the plurality of options is provided in one or more solicitations communicated to the customer.

7. The system of claim 1, wherein the plurality of options is provided in response to the customer requesting activation of the credit account.

8. The system of claim 1, wherein the plurality of options is provided in response to the customer requesting an increase of the line of credit.

9. A method for providing a customer a plurality of options for increasing a line of credit, the method comprising:
providing to a customer a plurality of options for increasing a line of credit associated with a credit account held by the customer, wherein the plurality of options each comprise an action to be taken by the customer other than acceptance of the credit account and payment activities associated with an outstanding balance of the credit account;
using one or more computer processors, receiving first data reflecting that the customer actively selected one or more options from among the plurality of options by performing the one or more actions that comprise the selected one or more options;
storing the first data; and
storing second data to reflect an increase of the line of credit provided as a result of the selection of the one or more options.

10. The method of claim 9, wherein the amount of the increase depends, at least in part, on the number of options selected by the customer.

11. The method of claim 9, wherein the amount of the increase depends, at least in part, on the one or more options selected by the customer.

12. The method of claim 9, wherein the plurality of options are provided only to certain customers.

13. The method of claim 12, wherein the certain customers have particular credit histories.

14. The method of claim 9, wherein the plurality of options is provided in one or more solicitations communicated to the customer.

15. The method of claim 9, wherein the plurality of options is provided in response to the customer requesting activation of the credit account.

16. The method of claim 9, wherein the plurality of options is provided in response to the customer requesting an increase of the line of credit.

17. A method for providing a customer a plurality of options for increasing a line of credit, the method comprising:
communicating to a customer one or more solicitations offering the customer a credit account;
receiving a response to the one or more solicitations from the customer requesting the credit account;
storing credit account data to book the credit account according to the response from the customer;
providing to the customer a plurality of options for increasing a line of credit associated with the credit account, wherein the plurality of options each comprise an action to be taken by the customer other than acceptance of the credit account and payment activities associated with an outstanding balance of the credit account;
using one or more computer processors, receiving first data reflecting that the customer actively selected one or more options from among the plurality of options by performing the one or more actions that comprise the selected one or more options;
storing the first data; and
storing second data to reflect an increase of the line of credit provided as a result of the selection of the one or more options.

18. The method of claim 17, wherein the amount of the increase depends, at least in part, on the number of options selected by the customer.

19. The method of claim 17, wherein the amount of the increase depends, at least in part, on the one or more options selected by the customer.

20. The method of claim 17, wherein the plurality of options are provided to the customer in response to the customer requesting an increase of the line of credit.

* * * * *